July 12, 1949.  J. J. DICKSON  2,475,597
EMERGENCY ARRESTING DEVICE FOR AIRCRAFT
Filed Aug. 29, 1945  2 Sheets-Sheet 1
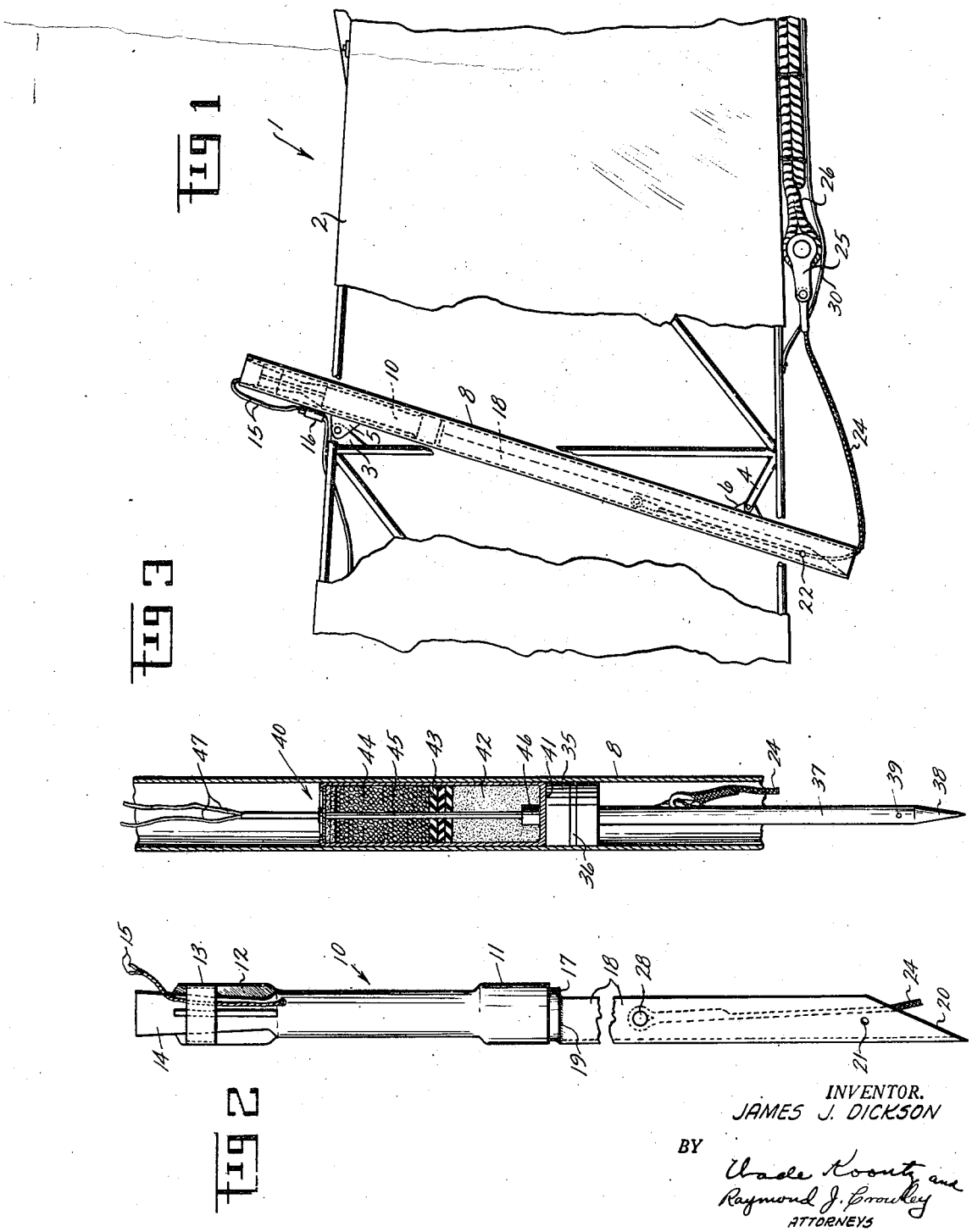
INVENTOR.
JAMES J. DICKSON
BY
ATTORNEYS July 12, 1949.                J. J. DICKSON                2,475,597
                 EMERGENCY ARRESTING DEVICE FOR AIRCRAFT
Filed Aug. 29, 1945                                 2 Sheets-Sheet 2
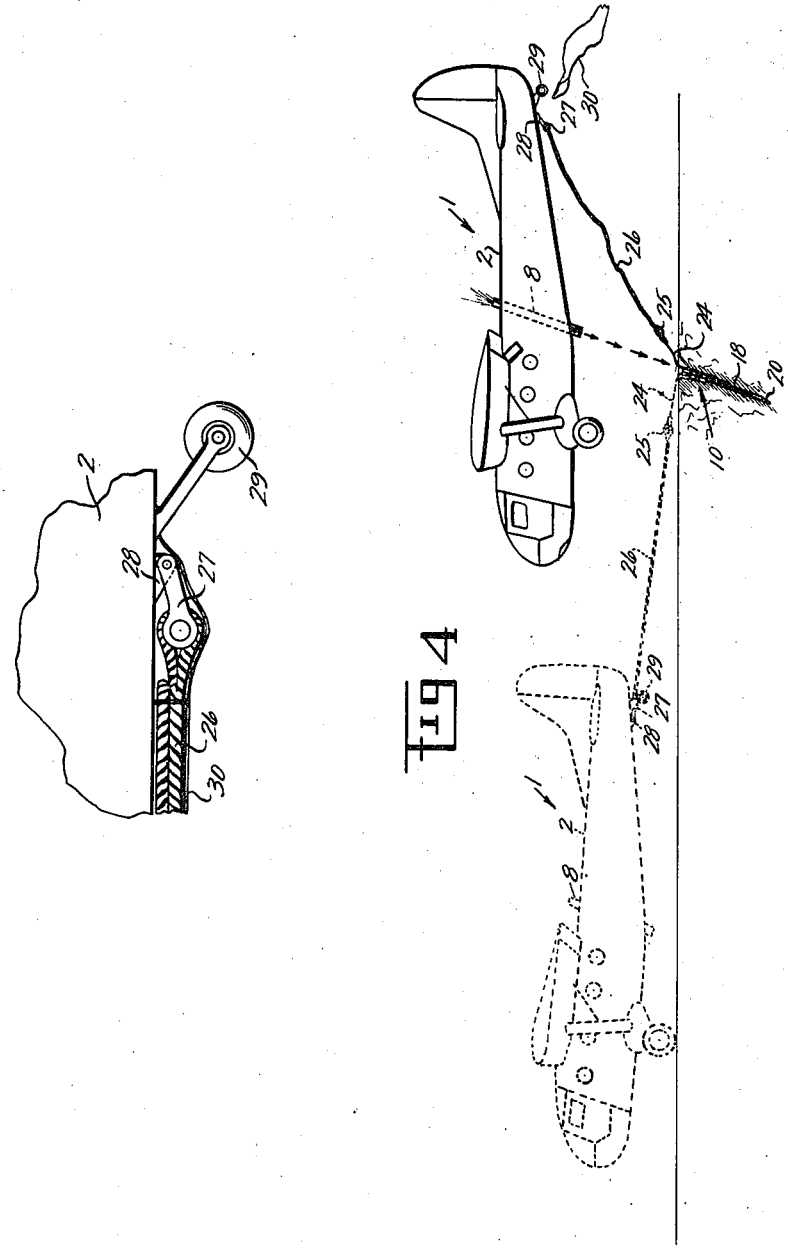
INVENTOR.
JAMES J. DICKSON
BY
Raymond J. Crowley
ATTORNEYS Patented July 12, 1949

2,475,597

UNITED STATES PATENT OFFICE 2,475,597

EMERGENCY ARRESTING DEVICE FOR AIRCRAFT

James J. Dickson, Dayton, Ohio

Application August 29, 1945, Serial No. 613,414

1 Claim. (Cl. 244—110)

(Granted under the act of March 3, 1883, as amended April 30, 1928; 370 O. G. 757)

The invention described herein may be manufactured and used by or for the Government for governmental purposes without payment to me of any royalty thereon.

This invention relates to an improved means for arresting heavier-than-air aircraft, particularly gliders employed in carrying troops and supplies.

During the present war many troop-carrying gliders have been unable to land at prearranged landing fields and in attempting to land in very small clearings have crashed against trees during the ground run after landing, resulting in destruction of the glider and injury to the occupants. Up until now no generally satisfactory emergency arresting means has been available which will safely stop a glider after contact with the ground within a short distance which does not involve an installation on the ground.

It has been proposed for example to arrest and moor lighter-than-air aircraft by dropping a long cable from a considerable altitude, the cable having a ground piercing spike or plummet on one end which is to pierce the earth's surface and form an anchor, and at least a part of the cable being made of a resilient material such as rubber.

It has been also proposed to suspend one or more cylinders below an airship, the cylinders having a bottle of gas under high pressure mounted thereon and adapted upon release to propel a piston from the cylinder and the piston having a ground engaging spike secured thereto and connected to a mooring cable.

Such prior proposals may have been satisfactory for their intended purpose but would be wholly unsatisfactory for the arresting of a glider or airplane, since the vertical velocity or rate of descent of an airplane or glider at the instant of landing is insufficient to render any gravity impeller anchor operative. Obviously, attempting to suspend a gas operated anchor device below a glider or aircraft would be dangerous and to mount such apparatus on the airplane would produce severe recoil forces if sufficient force is developed to drive a spike from 3 to 5 feet into hard ground. Further, the weight of such apparatus would be prohibitive.

In accordance with the present invention, an elastic restraining rope or cable is employed which has one end thereof connected to the airplane or glider and its other end connected to a ground piercing spike or anchor which is positioned in the discharge tube of a non-recoil gun and connected to a rocket propelled projectile or to a piston actuated by explosion forces of a powder charge. The discharge tube is open at both ends and is rigidly secured to the aircraft structure. Discharge of the rocket projectile at an altitude of three or four feet will drive the anchor or spike in the ground without producing any reaction upon the aircraft. Similarly by discharging shot or sand out the upper end of the discharge tube by explosion of a powder charge, sufficient force may be applied to a piston secured to a spike to drive the latter as much as five feet into hard ground and withstand forces of as much as six thousand pounds exerted on the restraining cable.

With the above in mind, other objects and features of the invention will be apparent by reference to the detailed description hereinafter given and to the appended drawings in which:

Figs. 1 and 1A illustrate apparatus in accordance with the invention mounted on the fuselage of a glider;

Fig. 2 illustrates on a larger scale the rocket propelled projectile and spike employed in the device of Fig. 1;

Fig. 3 illustrates a modified form of ground engaging spike adapted to be propelled by a shot shell;

Fig. 4 illustrates the operation of apparatus in accordance with the invention during the landing of a glider.

Referring now to Figs. 1 and 1A, reference numeral 1 generally indicates a large troop carrying glider having a fuselage 2, the structure of which is provided with mounting brackets 3 and 4 to which lugs 5 and 6 are respectively bolted, the lugs being secured as by welding to the discharge tube 8 of a non-recoil type of gun. The recoil tube 8 is inclined backward from the vertical at such an angle that when the aircraft or glider upon which the tube is mounted is in the landing attitude, the axis of the tube will be inclined approximately 30° from the vertical. The tube, which may be of high strength seamless steel tubing, extends a short distance above and below the fuselage and preferably has a major portion thereof inclosed within the interior of the fuselage to reduce air resistance; though, if desired, it may be mounted on the side of the fuselage.

The rocket projectile generally indicated by the reference numeral 10 is positioned within the discharge tube 8 and is of a type similar to that employed in the well-known bazooka gun.

As seen in Fig. 2, the rocket projectile 10 includes a generally cylindrical casing having a piston portion 11 with fins 12 mounted on its upper end and the latter being surrounded by a guide ring portion 13. The fins 12 are secured to a conical discharge tube 14 from which the propellant gases emerge. Suitable electrical conductors 15 having terminals inserted in a plug connector 16 serve to carry ignition current from a battery to an igniter, not shown, positioned within the body of the projectile.

As seen in detail in Fig. 2, the ground engaging spike 18 is secured as by welding to a closure member 17 screwed into the lower end of the casing of the rocket projectile 10, the spike 18 being made from heavy steel, angle iron and cut off at its lower end on an inclined plane to a sharp ground piercing point as indicated at 20. The spike 18 is provided with a hole 21, through which a safety wire or pin may be passed and extending through registering holes 22 provided adjacent the lower end of the discharge tube 8, as shown in Fig. 1. The safety wire or pin serves to support the rocket projectile and spike in the discharge tube until the projectile is fired, whereupon the safety wire will be sheared. A transverse pin 28 is welded to the spike and serves as an anchor for the upper end of a flexible steel cable 24, which, as seen in Fig. 1, extends from the bottom of the discharge tube 8 and is connected at its other end to a clevis 25 which, in turn, is connected to the spliced end of a flexible rope 26 made of undrawn nylon or similar material having the property of elongating under load to at least 100 percent and preferably as much as 400 percent of its initial length. The rope may be stranded or may be braided, woven or knitted and other materials beside nylon possessing the requisite properties of resilience are suitable. One pound of undrawn nylon when extended about 400 percent of its initial length is capable of absorbing 55,000 foot pounds of energy and by suitable selection of rope dimensions the magnitude of deceleration may be controlled for a given weight of aircraft.

The rope 26 is doubled back upon itself and is secured as seen in Fig. 1A at its other end to a similar clevis or shackle 27 which in turn is pivotally connected to a fitting 28 secured to the glider fuselage framework just forward and to one side of the tail wheel 29.

As seen in Fig. 1, the rope 26 is supported beneath the glider fuselage and is preferably enclosed by means of a fabric flap 30 which may be secured to the fuselage by means of lashing cords passing through eyelets, not shown, which can be readily ruptured to permit the rope to be discharged but tending to reduce air resistance during flight. If desired a portion of the rope may be stowed within the fuselage, a suitable exit guide being provided.

In lieu of the use of a rocket projectile, another well-known type of recoil gun employing an open ended discharge tube is illustrated in Fig. 3. As seen in this figure, the discharge tube 8 contains a piston 35 provided with a piston ring of soft metal 36 for providing a suitable seal, the piston having a ground piercing spike 37 connected thereto sharpened to a point as indicated at 38. The spike 37 is provided with a transverse hole 39 through which safety wire or a shear pin may be passed to support the assembly in the discharge tube 8 in the same manner as described with reference to supporting the spike and projectile of Fig. 1. A shot shell, generally indicated by the reference numeral 40, is positioned within the discharge tube above the piston 35 and has its lower end resting in contact therewith. The shot shell 40 of conventional construction comprises an impregnated cardboard or thin metal container 41 closed at its lower end and having a powder charge 42 positioned therein and retained by suitable wadding 43. A charge of lead shot or other high density material 44 is positioned in the upper part of the container 41 and the container is sealed at its upper end in the manner of a conventional shot shell construction.

The shell 40 is provided with an insulating tube 45 extending along the central axis thereof and connecting to an electrical igniter 46. Igniter wires 47 pass downward through the insulating tube 45 to the igniter 46 to fire the shell electrically from an external circuit.

In addition to the anti-recoil projectile discharging means shown other known types of anti-recoil guns for example which simply employ a cartridge loaded with powder and the discharge tube contains baffling means to throttle the discharge of the propellant gases out of the upper end of the discharge tube.

Operation

The operation of the arresting means in accordance with the invention is illustrated in Fig. 4 and as seen in the full line view of the glider 1, the pilot has discharged a rocket projectile 10 and spike 18 of the type shown in Figs. 1 and 2 from the discharge tube 8 and the spike has penetrated the ground. The rope 26 is then pulled free and is slack until after the glider 1 contacts the ground as indicated in the dotted line view. The arresting cable or rope 26 then begins to pull on the spike 18 and begins to elongate furnishing a large arresting force which increases to a maximum value of as much as six thousand pounds. The glider will be brought to a full stop when the rope 26 has elongated from 100 to 400 per cent of its initial length depending on the nature of the rope material and the amount of energy to be absorbed. When undrawn synthetic fibres such as nylon are used in making the arresting rope or cable there will be no appreciable recoil since the recovery time of such materials is considerable and much of the energy will be dissipated as internal molecular friction leaving the rope permanently elongated.

Although the preferred modes of carrying out the invention have been illustrated and described other variations and changes therein will be apparent to those skilled in the art as falling within the scope of the invention as defined by the appended claim.

I claim:

An emergency arresting device for heavier than air type aircraft comprising a nonrecoil gun mounted on the aircraft fuselage, said gun including a discharge tube open at its ends, and a projectile within the tube, a ground piercing spike adapted to be propelled by the projectile to serve as a ground anchor, and a resilient arresting cable made of undrawn nylon and capable of elongating at least one hundred percent of its initial length without appreciable recoil being secured respectively at its ends to the aircraft and the spike.

JAMES J. DICKSON.

REFERENCES CITED

The following references are of record in the file of this patent:

UNITED STATES PATENTS

| Number | Name | Date |
| --- | --- | --- |
| 1,108,714 | Davis | Aug. 25, 1914 |
| 1,661,091 | Riabouchinski | Feb. 28, 1928 |
| 2,130,948 | Carothers | Sept. 20, 1938 |
| 2,343,892 | Dodge et al. | Mar. 14, 1944 |

FOREIGN PATENTS

| Number | Country | Date |
| --- | --- | --- |
| 533,475 | France | Dec. 10, 1921 |